(12) United States Patent
Lahteenmaki et al.

(10) Patent No.: US 8,397,878 B2
(45) Date of Patent: Mar. 19, 2013

(54) ELECTRICALLY ACTUATED STORM BRAKE FOR CRANE AND METHOD FOR ACTUATING THE BRAKE

(75) Inventors: Janne Lahteenmaki, Alpharetta, GA (US); Jouko Koponen, Kirkland (CA)

(73) Assignee: Andritz Inc., Glens Falls, NY (US)

( * ) Notice: Subject to any disclaimer, the term of this patent is extended or adjusted under 35 U.S.C. 154(b) by 1099 days.

(21) Appl. No.: 12/354,814

(22) Filed: Jan. 16, 2009

(65) Prior Publication Data

US 2010/0108447 A1    May 6, 2010

Related U.S. Application Data

(60) Provisional application No. 61/111,135, filed on Nov. 4, 2008.

(51) Int. Cl.
*B61H 7/00* (2006.01)

(52) U.S. Cl. .............................. 188/41; 188/47

(58) Field of Classification Search .............. 188/33, 188/34, 35, 41, 43, 44, 47; 104/249, 258
See application file for complete search history.

(56) References Cited

U.S. PATENT DOCUMENTS

| | | | | | |
|---|---|---|---|---|---|
| 584,452 | A | * | 6/1897 | Benjamins | 188/41 |
| 924,720 | A | * | 6/1909 | Allen | 188/41 |
| 1,222,935 | A | * | 4/1917 | Dingle | 188/41 |
| 1,273,212 | A | * | 7/1918 | Freimark | 188/41 |
| 1,346,171 | A | * | 7/1920 | Brinker | 188/41 |
| 1,388,047 | A | * | 8/1921 | Jones | 188/41 |
| 2,397,237 | A | * | 3/1946 | Brolus | 188/43 |
| 3,807,532 | A | * | 4/1974 | Molt | 188/43 |

FOREIGN PATENT DOCUMENTS

CA    2055260    5/1992

* cited by examiner

*Primary Examiner* — Thomas J Williams
(74) *Attorney, Agent, or Firm* — Nixon & Vanderhye P.C.

(57) ABSTRACT

A storm brake for a truck assembly supporting a large industrial device, wherein the truck assembly includes a truck chassis having a mount to support the device and a wheel engaging a raceway along which the truck assembly and device are to travel, the storm brake including: a storm brake shoe pivotably mounted to the truck chassis, wherein the storm brake shoe has a first pivot position in which the brake does not engage the raceway and a second pivot position in which the brake engages the raceway, wherein the storm brake shoe pivots in a direction generally aligned with a direction movement of the truck assembly along the raceway; an actuator having an extendable linkage coupled to the storm brake shoe and at an opposite end to a fixed mounting on the truck chassis, wherein extension of the linkage pivots the storm brake from the first position to the second position, and the fixed mounting provides a slidable engagement between the opposite end of the actuator and the truck chassis.

23 Claims, 6 Drawing Sheets

ELECTRICALLY ACTUATED STORM BRAKE FOR CRANE AND METHOD FOR ACTUATING THE BRAKE

This application claims the benefit of U.S. Provisional Patent Application Ser. No. 61/111,135, filed Nov. 4, 2008, the entirety of which is incorporated herein by reference.

BACKGROUND OF THE INVENTION

This invention relates to storm or emergency brakes for cranes. Specifically, the present invention relates to a fail-safe storm or emergency brake system for outdoor cranes, such as bridge, gantry, and portal cranes.

Large outdoor cranes, such as, for example, those employed in the logging industry, are often set up to move along a raceway, such as straight or curved rail, runway or other surface. The raceway may be, for example, a ballast and tie rail system, concrete slab rail or an elevated beam rail. A wheeled truck supports the leg(s) of the crane and moves across the runway. Cranes often employ two sets of legs connected by a structural girder arranged in a sawhorse configuration. Each leg of the girder may be driven bi-directionally along the runway, such as by motor driven wheels in the truck at the base of each leg. Alternatively, the crane may pivot about a center leg and an outer leg may move on a truck that rolls over an arc-shaped or circular surface.

The motion of these cranes along the runway may be slowed and ultimately stopped during normal operation of the crane by utilizing a standard braking system. The standard braking action may be accomplished by utilizing the regenerative capacity of the motors, such as by electrically slowing the motor to apply a retarding torque to the wheel gear box assembly in the truck, and thereby slow the crane. However, standard crane systems may not be suitable to slow or stop the crane during severe storm conditions or during other runaway situations caused by electrical or mechanical malfunctions.

High winds apply large forces to the crane. Strong winds may apply high loads to the cranes that often have great operational clearance heights and widths, such as on the order of heights of over one hundred feet (33 meters (m)) and widths of several hundred feet (such as greater than 100 m). The force applied by wind to the crane may cause the wheels of the truck to skid across the surface, even though the wheels are locked by the standard brake.

Cranes are top heavy and have the potential to overcome the braking and topple over, become twisted or become otherwise damaged if allowed to slide and move during high winds. Uncontrolled movements by the crane, such as may occur due to high winds, may damage the crane, the runway and surrounding areas. These uncontrolled crane movements may result in harm to personnel such as crane operators attempting to regain control over the crane and others in the vicinity while a crane topples.

To protect against damage and injury due to severe wind conditions occurring during non-operational periods, storm brakes in the trucks of the cranes engage the runway when wind forces overcome the braking action of the standard brakes and the wheels in the trucks slide across the runway. Storm brakes provide dynamic and emergency braking to stop and secure the crane. An example of storm brakes are disclosed in Canadian Published Patent Application 5,006,0/98 entitled "Storm Brake for Cranes." Some storm brakes have brake shoe that move vertically downward and are rammed directly against the runway to achieve braking action. These ram-type brakes employ a brake shoe mounted on a piston that is moved hydraulically or pneumatically and mounted in a spring-set cylinder. The brake shoe is hydraulically or pneumatically moved downward and pressed against the runway.

The friction forces between the brake shoe and runway are greater than between the wheels and the runway. The larger friction forces of the brake shoe provide greater braking force between the truck and the runway than is achieved by braking just the wheels. Often the braking force is increased by causing the wheels come up from the raceway and thus increasing the load on the applied storm brake. The storm brakes when engaged hold the trucks and legs of the crane more securely to a single location on the runway than do the standard brakes alone.

However, hydraulic and pneumatic storm brake systems require maintenance and, at times, drip hydraulic fluid and compressor lubricants or antifreeze on the runway. Maintenance of these storm brake systems is consistent with large industrial hydraulic and pneumatic systems. These systems have pressurized fluid conduits that are prone to leakage and require regular inspection and periodic replacement of pressure components. The maintenance can be expensive in terms of the cost of repairs and in terms of lost crane productivity while the crane is immobilized for inspection and repair. In addition, the fluids in hydraulic and pneumatic storm brakes too often drip and are otherwise deposited on the runway. These fluids tend to be slippery and may cause the wheels on the girders to lose traction with the runway. The loss of traction in the wheels may result in sliding of the wheels and uncontrolled movements of the crane. Accordingly, there is a long felt need for a storm brake system that requires less maintenance than conventional hydraulic and pneumatic storm brake systems and does not deposit slippery fluids on the runway.

BRIEF DESCRIPTION OF THE INVENTION

A storm brake has been invented for a truck assembly supporting a large industrial device, wherein the truck assembly includes a truck chassis having a mount to support the device and a wheel engaging a raceway along which the truck assembly and device are to travel, the storm brake in one embodiment including: a storm brake shoe pivotably mounted to the truck chassis, wherein the storm brake shoe has a first pivot position in which the brake does not engage the raceway and a second pivot position in which the brake engages the raceway, wherein the storm brake shoe pivots in a direction generally aligned with a direction movement of the truck assembly along the raceway; an actuator having an extendable linkage coupled to the storm brake shoe and at an opposite end to a fixed mounting on the truck chassis, wherein extension of the linkage pivots the storm brake from the first position to the second position, and the fixed mounting provides a slidable engagement between the opposite end of the actuator and the truck chassis.

A truck assembly has been invented for a large industrial device, the assembly in one embodiment including: a truck chassis having a mount to support the device and a wheel engaging a raceway along which the truck assembly and device are to travel; a storm brake shoe pivotably mounted to the truck chassis, wherein the storm brake shoe has a first pivot position in which the brake does not engage the raceway and a second pivot position in which the brake engages the raceway, wherein the storm brake shoe pivots in a direction generally aligned with a direction of movement of the truck assembly along the raceway; an actuator having an extendable linkage coupled to the storm brake shoe and at an opposite end to a fixed mounting on the truck chassis, wherein extension of the linkage pivots the storm brake from the first position to the second position, and the fixed mounting provides a slidable engagement between the opposite end of the actuator and the truck chassis.

A truck assembly for a large industrial device including: a truck chassis having a mount to support the device and a wheel engaging a raceway along which the truck assembly and device are to travel; a storm brake shoe pivotably mounted with respect to the truck chassis, wherein the storm brake shoe has a first pivot position in which the brake does not engage the raceway and a second pivot position in which the brake engages the raceway, wherein the storm brake shoe pivots in a direction generally aligned with a direction movement of the truck assembly along the raceway; an actuator having an extendable linkage coupled to the storm brake shoe and at an opposite end to a mount coupled to the truck chassis, wherein extension of the linkage pivots the storm brake from the first position to the second position, and the mount provides a moveable engagement between the opposite end of the actuator and the truck chassis.

The storm brake for a truck assembly supporting a large industrial device, wherein the truck assembly includes a truck chassis having a mount to support the device and a wheel engaging a raceway along which the truck assembly and device are to travel, the storm brake comprising: a storm brake shoe pivotably mounted to the truck chassis, wherein the storm brake shoe has a first pivot position in which the brake does not engage the raceway and a second pivot position in which the brake engages the raceway, wherein the storm brake shoe pivots in a direction generally aligned with a direction movement of the truck assembly along the raceway; an actuator having an extendable linkage coupled to the storm brake shoe and at an opposite end to a fixed mounting on the truck chassis, wherein extension of the linkage pivots the storm brake from the first position to the second position, and the fixed mounting provides a slidable engagement between the opposite end of the actuator and the truck chassis.

The truck assembly for a large industrial device comprising: a truck chassis having a mount to support the device and a wheel engaging a raceway along which the truck assembly and device are to travel; a storm brake shoe pivotably mounted with respect to the truck chassis, wherein the storm brake shoe has a first pivot position in which the brake does not engage the raceway and a second pivot position in which the brake engages the raceway, wherein the storm brake shoe pivots in a direction generally aligned with a direction movement of the truck assembly along the raceway; an actuator having an extendable linkage coupled to the storm brake shoe and at an opposite end to a mount coupled to the truck chassis, wherein extension of the linkage pivots the storm brake from the first position to the second position, and the mount provides a moveable engagement between the opposite end of the actuator and the truck chassis, wherein the moveable engagement adjusts the elevation of the opposite end of the actuator.

DETAILED DESCRIPTION OF THE INVENTION

Figure 1:
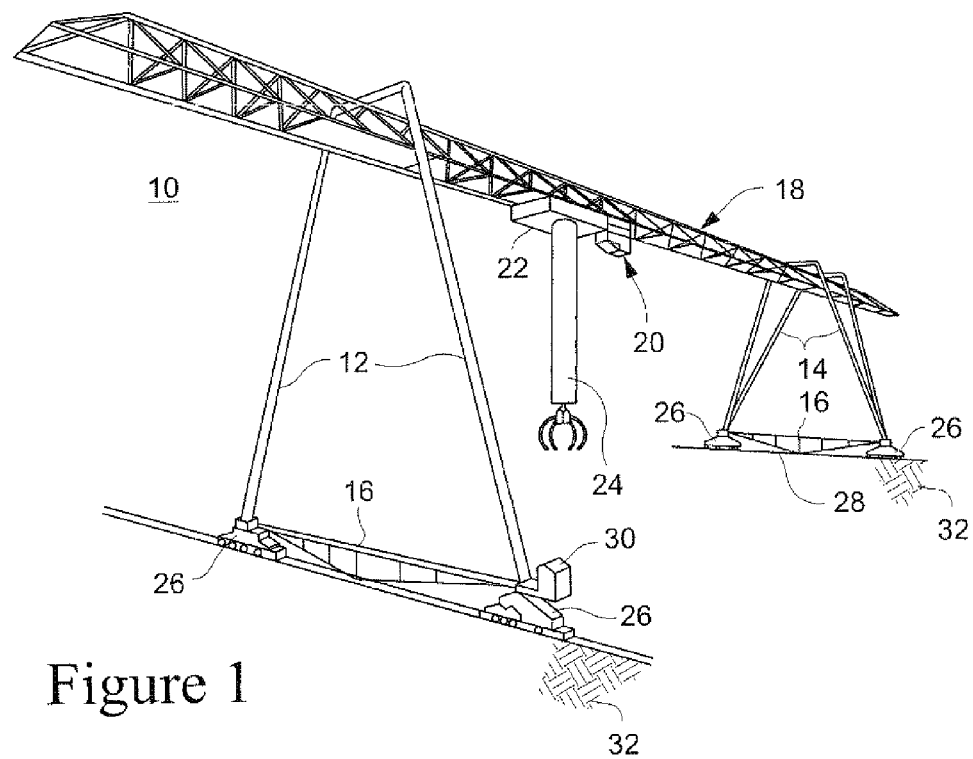
FIG. 1 is a perspective view of a machine crane.

FIG. 1 is a perspective view of a conventional crane 10, such as a straight track portal crane for handling logs, a bridge crane, or a gantry crane. These types of cranes typically include storm brakes. The crane may have a height (H) of, for example, 100 feet (33 m) and a length (L) of 200 feet (66 m) and a width (W) at its base of 70 feet (21 m). These dimensions are exemplary and are presented solely to provide the reader with a sense of the size of these cranes.

The exemplary crane 10 includes hinged girder legs 12, fixed girder legs 14, and beams 16 extending between the bases of the legs. A girder bridge 18 is supported by the legs and extends across the top of the legs. A moveable electrical control room 20, positioned on the bridge 18, houses a crane operator and controls to operate the crane. A trolley 22 may move with the control room along the length of the bridge 18. A load lifting device 24 below the trolley moves vertically and with the trolley. The bottoms of the legs are supported by truck assemblies 26 having wheels that roll along a raceway 28, that may be a rail, track or other surface to support the wheels. The truck assemblies have associated motors that are coupled to a power source 30, such as a high voltage transformer.

An operator in the control room 20 manipulates the crane 10 such that the grasping device 24 moves into position on the ground 32 below the bridge 18 by moving the load lifting device 24 up and down below the trolley 22, moving the trolley back and forth along the bridge 18, and moving the legs 12, 14 of the crane along the raceway 28. These three available directions of movement enable the operator to position the load lifting device 24 at any position below the bridge 18 and on the area of the ground 32, within the raceways 28, or other surface.

A power source 30 is shown mounted in proximity to the hinged leg 12 or fixed leg 14 and truck assemblies 26 of the crane 10. Any number of truck assemblies 26 may be employed on a given crane device depending on the operational load requirements of the crane. For example, the base of each leg may be mounted on a truck assembly 26.

Figure 2:
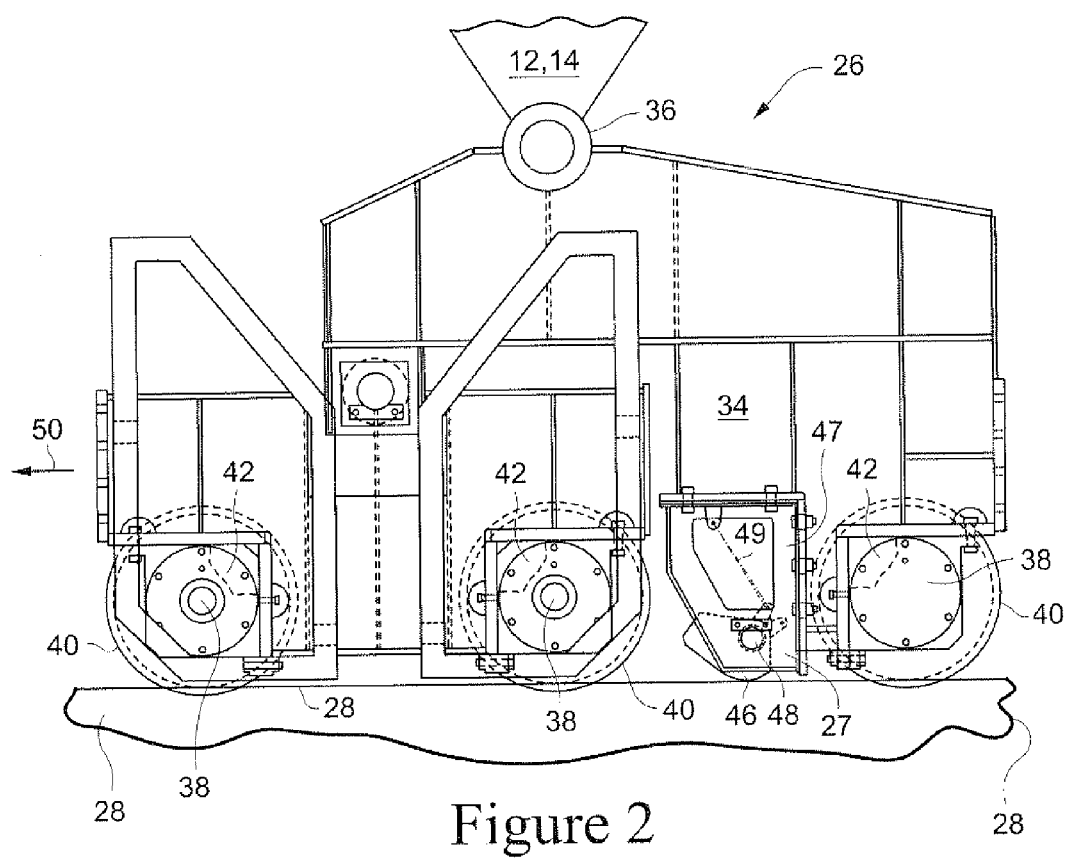
FIG. 2 is a side view of a truck assembly which supports a leg of the crane and includes wheels that engage the raceway and a conventional storm brake.

FIG. 2 shows an enlarged portion of a truck assembly 26 having a conventional storm brake 27. The truck assembly 26 preferably comprises a chassis 34 that has an upper region which includes a mounting bracket 36 that attaches to a foot of a leg 12, 14 of the crane. Generally, each leg of the crane that moves across the raceway 28 attaches to a separate truck assembly 26. A lower region of the chassis 34 includes conventional wheel supports 38, such as axles, bearings and shock absorbers. The wheels 40 are rotatably mounted to a respective axle of the wheel support. The wheels engage the raceway 28 and rotate during controlled movement of the truck assembly and associated leg of the crane. The wheels are driven by motors (not shown) in the truck assembly that are preferably electrically powered from the power source 30 (FIG. 1). The power source may include an uninterrupted power supply (UPS) to power the storm brake in the event of a power outage at crane site.

The wheel support 38 may also comprise a disc or shoe brake 42, that may be a conventional brake for the wheels. The disc or shoe brake mechanism 42 engages the wheel to slow and stop the wheel. The braking action of the braking mechanism is typically controlled by the operator in the control room 20 (FIG. 1).

The truck assembly 26 includes a conventional storm brake 27 that includes a brake shoe 46 which pivots about an axle and bearing assembly 48. The brake shoe 46 and axle and bearing assembly 48 are mounted in a generally rectangular bracket 47 that is affixed to a lower mount of the truck assembly. During normal operation, the brake shoe is pivoted such that the brake shoe is above the raceway and does not apply a braking force to the truck assembly. During high winds or other situations when the storm brake is needed to secure the truck assembly, the brake shoe 46 pivots downward such that the shoe engages the raceway 28. Preferably, the brake shoe pivots such that brake shoe moves in a similar direction 50 of movement of the truck assembly due to wind forces. Because the direction of wind forces is variable, two or more storm brakes are typically needed with the brakes arranged to stop the truck assembly when moving in either direction. For example, a leading storm brake may be applied to a truck assembly on a front leg of the crane and a trailing storm brake may be applied to a truck assembly on a rear leg of the crane.

As it pivots down to and engages the raceway, the storm brake shoe 46 engages the raceway 28. After initial engagement between the brake shoe and raceway, further movement of the truck assembly 26 attempts to further pivot the brake shoe down onto the raceway. This feature is called self-energizing. However, the brake shoe is firmly engaged with the raceway and any further pivot movement of the brake shoe applies a large friction force between the raceway and the truck assembly and an upward force on truck assembly and the crane. The weight of the truck assembly and crane counteract the upward force and hence resist movement of the brake shoe on the raceway. The friction force between the brake shoe and raceway is large, such as compared to the friction force between the wheels 40 and the raceway. The friction force is large because the load from the wheels is transferred to the brake shoe when the shoe cams over and engages the raceway. Also, the friction surface of the shoe may be made highly frictional e.g. by serration, or using materials or layers of materials that have high friction coefficient between the shoe and raceway. Due to the large friction force, the brake shoe of the storm brake 46 does not slide along the raceway. Accordingly, the storm brake should stop the truck assembly even though the brake 42 and wheels may slip along the raceway. Further the wheels may develop a flat region and loose their roundness if allowed to slide across the raceway. Wheels with flat regions may have to be discarded. The storm brake shoe avoids developing flat regions on the wheels by preventing or minimizing sliding between the wheels and raceway and lifting the wheels off the raceway when the shoes are engaged with the raceway.

The initial engagement between the storm brake shoe 46 may be forceful such that substantial impact forces are transmitted from the raceway, through the brake shoe 46 and to the axle and bearing assembly 48 coupling the brake shoe to the truck. In conventional storm brakes, the impact forces are partially absorbed by pneumatic and hydraulic arms 49 that pivot the brake shoe 46 into engagement with the raceway. Pressure relief valves in the pneumatic and hydraulic arms 49 relieve pressure in the arms and thereby prevent excessive impact forces being applied directly to these arms.

Figure 3:
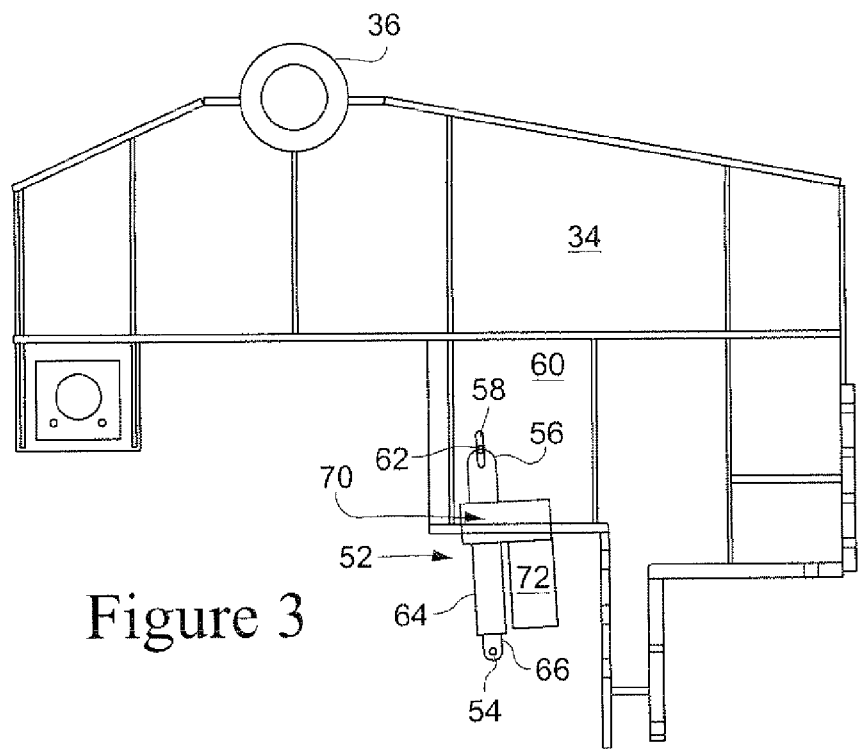
FIG. 3 is an enlarged view of the truck chassis showing an elongated slot to receive an end connection of an actuator for the storm brake.

FIG. 3 is an enlarged view of an electrical actuator 52 and its coupling to a sidewall 60 of the chassis 26 of the truck assembly. In place of a pneumatic and hydraulic arm, the electrical actuator 52 pivots the brake shoe of the storm brake. The electrical actuator 52 includes an extendable linkage that is coupled at one end 54 to the brake shoe and at an opposite end 56 to an elongated slot 58 in sidewall 60 of the truck assembly 26. The slot 58 preferably has a vertical orientation and a length of about two inches (40 mm to 50 mm). The slot may be a single vertical slot in the sidewall 60 of the truck assembly. Alternatively, the slot may be a pair of opposite slots or rails which receive opposite ends of the pin 62 of the upper end of the electrical actuator. The pin 62 in the opposite end of the electrical actuator 56 is slidably mounted in the slot. The pin 62 may slide, for example, about two inches (40 mm to 50 mm) in the slot. Yet, in another alternative, the slot may be replaced with a lever system that allows the upper end of the electrical actuator to move.

The actuator 52, e.g., an electrical actuator, includes a generally cylindrical casing 64 that houses an extendable shaft 66. The lower end of the shaft couples to a cam 68 (FIG. 4) on the brake shoe 46. The shaft 66 is extended axially from the casing, e.g., vertically downward, to pivot the brake shoe. The shaft 66 may be threaded and extended by gearing in a gear box 70 in the actuator. The shaft may extend by, for example, four inches (100 mm). This extension of the shaft is sufficient to pivot the brake shoe to engage the raceway. The gearing is turned in a controlled manner by an electrical motor 72. Alternatively, the actuator 52 may be a hydraulic or pneumatic device in which a pressurize fluid is applied in the casing 64 to extend the shaft 66. In this alternative actuator, the motor 72 pressurizes the fluid in the casing. The motor is controlled by an operator in the control room who may manually activate the motor to engage the storm brake while the crane 10 is shut down during high winds or by a computer control system that automatically engages the storm brakes when it detects high winds or wheels sliding along the raceway for more than a predetermined distance.

Figure 4:
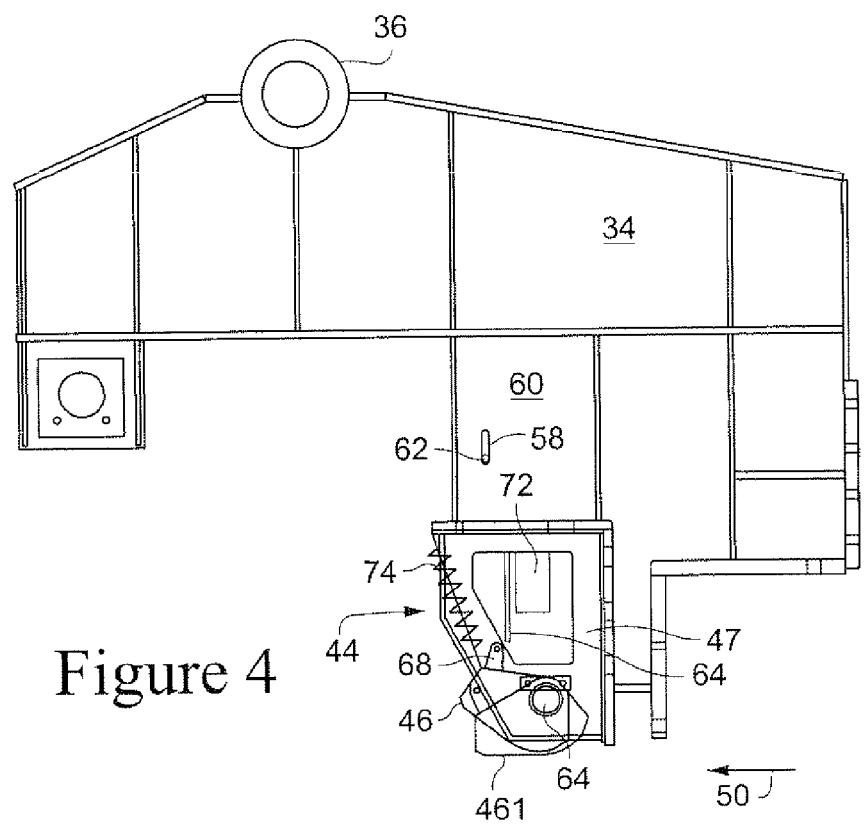
FIG. 4 is an enlarged view of the truck chassis showing that storm brake and an actuator for the storm brake.

FIG. 4 is an enlarged view of the actuator 52 and its coupling to the storm brake 44. The bracket 47 for the storm brake is mounted to a lower region of the chassis 34 of the truck assembly. A spring 74 holds the storm brake shoe 46 in an up and non-engaged position. The spring also holds the pin 62 at the top of the slot in the beginning of the work stroke. The spring is preferably attached at one end to the bracket 47 and at a lower end to a corner of the shoe distant from the axel and bearing assembly 48. However, the spring does not need to be distant. For example, a torsion spring may be placed on the center pivot axle of the brake shoe. Further, the spring may be replaced or supplemented by a counterweight that holds the shoe in an unengaged position until the actuator forces the shoe to engage the raceway.

Portions of the casing 64 and gear motor 72 of the actuator are visible in an opening of the bracket 47. The lower end of the shaft of the actuator is connected to the cam 68 of the brake shoe 46. As the actuator shaft is extended, the brake shoe pivots downward where the shoe engages the raceway. The brake shoe may move only a small distance, such as two to four inches or 100 mm, from its non-engaged position to its engaged position shown as a dotted line brake shoe 461. Alternatively, the actuator may be placed elsewhere for easier maintenance or if there is not enough room inside the storm brake. In that case a lever, or wire rope pulley system may be used to transfer the force and motion of the actuator to the shoe.

Once the brake shoe engages the raceway, any movement (see direction 50) of the shoe along the raceway can cause the shoe to pivot further and thereby resist the movement. As the brake shoe engages the raceway, any further movement of the truck assembly on the raceway causes the brake shoe to bind against the raceway. The further pivoting of the brake shoe due to movement of the shoe along the raceway can be rapid and result in large impact forces being applied to the shoe, and axle and bearing assembly 48. Preferably, the shoe and axel and bearing assembly are sufficiently robust to withstand such impact forces. However, the actuator 52 may not be able to withstand large impact forces, as such forces may damage the gearing and threads in casing 64 and on the shaft 66.

The pin 62 at the upper end of the actuator 52 slides in the slot 58 when an impact force is applied to the actuator 52. The pin is preferably at the top of the slot when the shoe is not engaged with the raceway. The impact forces arise as the brake shoe engages the raceway. The sliding of the pin 62 in the slot prevents excessive impact forces from being applied to the electrical actuator. The length of the slot 58, e.g., about two inches (40 mm to 50 mm), is sufficient to allow the pin 62 to slide while the brake shoe firmly engages the raceway. The brake shoe pivots only a few degrees after engaging the raceway and thus the vertical movement of the pin 62 is relatively small, e.g., less than two inches (40 mm to 50 mm). Once the brake shoe has firmly engaged the raceway, the brake shoe should not further pivot and thus does not cause the pin to slide to the upper or lower ends of the slot.

For example, the pin 62 may be at an upper end of the slot 62 as the actuator 52 extends the shaft 66 and thereby lowers the storm brake shoe 46. After the shoe engages the raceway, the shoe may rapidly pivot due to the friction between the shoe and raceway if the truck assembly moves slightly with respect to the raceway. During this rapid movement, the pin 62 is pulled downward towards the bottom region of the slot 62. This downward movement of the pin avoids large impact forces being applied to the actuator.

Figure 5:
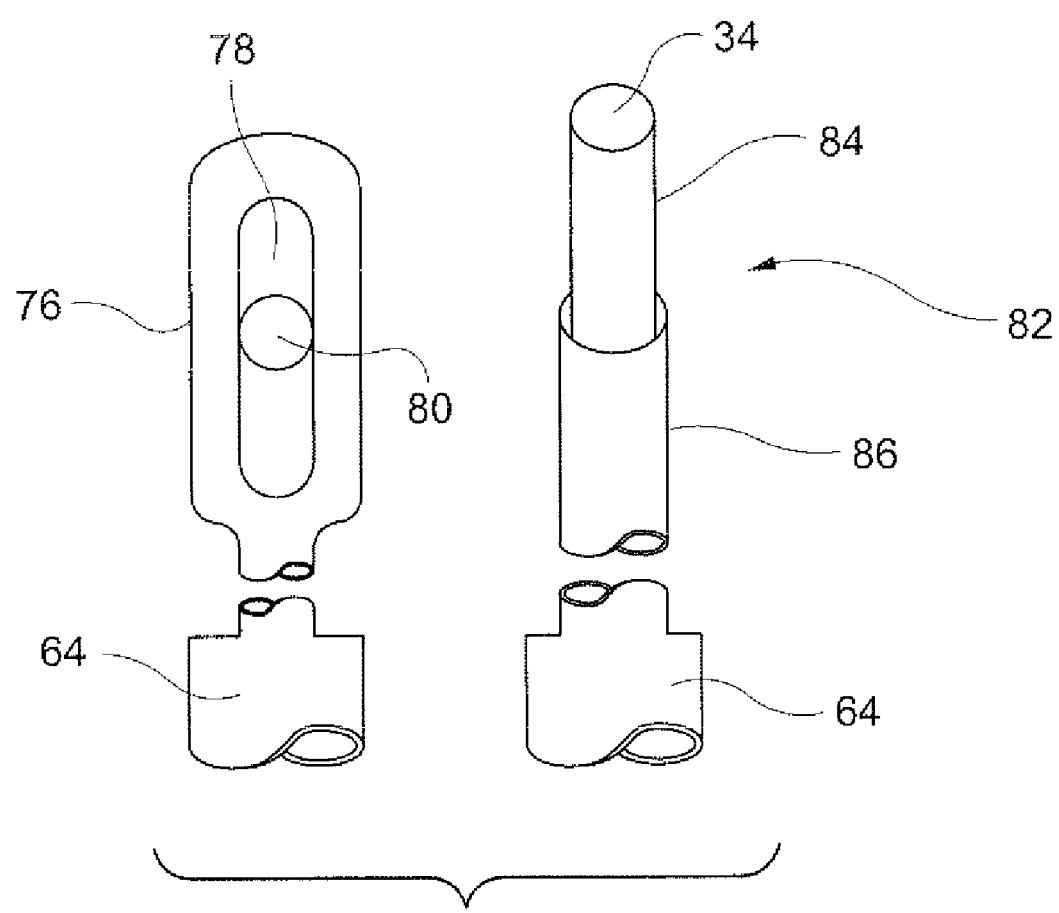
FIG. 5 shows alternative arrangements to provide a sliding movement between an actuator and a mounting for actuator on a truck assembly.
Figure 11:
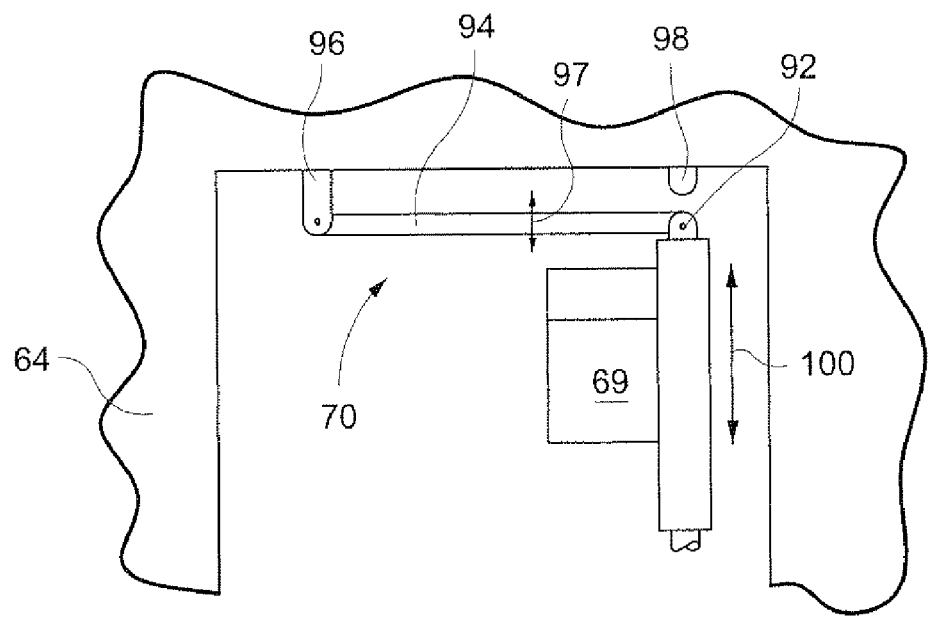
FIG. 11 is an enlarged view of the lever arm assembly of the storm brake shown in FIG. 6.

FIG. 5 shows alternative arrangements for providing a slidable coupling between the actuator and the truck assembly. For example, the upper end 76 of the actuator casing may have a slot 78 to receive a pin or post 80 fixed to the sidewall of the truck chassis. In another example, the upper end 82 of the actuator assembly may be a telescoping shaft having a first shaft 84 that slides axially within a second cylindrical shaft 86. The upper end of the first shaft 84 is pivotably mounted to the truck chassis. FIG. 11 shows another example in which the upper end 92 of the actuator assembly may be attached to a lever bar 94 that allows limited vertical movement of the actuator assembly.

FIGS. 6 to 10 are various views of a truck assembly 26 having a storm brake assembly 60, wherein the storm brake pad 46 is shown in various positions. The storm brake assembly is mounted in a cavity 62 under the truck chassis and between the wheels 40 of the truck assembly. The storm brake assembly includes a generally rectangular housing 64 attached to the underside of the chassis and having an open bottom adjacent the raceway 28. Within the housing 64 is a pair of brackets 66, e.g., vertically mounted plates or beams, that support the brake shoe 46. Specifically, the bracket supports the axial and bearing assembly 48 for the brake shoe.

Within the housing 64 and between the brackets 66 is an actuator assembly 69 having a lever arm assembly 70 and an electrical actuator 72. Coil springs 74 are arranged in the housing and outside the brackets 66. A lower end of each coil spring attaches to the brake shoe and an upper end attaches to the bracket, housing or chassis. The actuator assembly can be controlled to pivot the brake shoe down into engagement with the raceway. The coil springs biases the brake shoe 46 to an up position that disengages the shoe from the raceway. The actuator assembly extends the coil spring when pivoting the brake shoe down to engage the raceway. The coil spring pivots the brake shoe upward when the actuator assembly is not pivoting the brake shoe downward. The coil springs may be replaced or supplemented by a counter-weight, torsion bar or other device that disengages the brake shoe.

The lever arm assembly 70 of actuator assembly 69 is arranged generally horizontally and pivotably attached at one end to the housing or chassis and at an opposite end to an upper end of the electrical actuator 72. The lever arm assembly 70 allows the brake shoe with actuator assembly to quickly pivot downward when the shoe engages the raceway. Because of the movement of the lever arm assembly, the impact and shock that occurs when the brake shoe engages the raceway is absorbed by the brake shoe 46, bearing assembly 48 and bracket 66, and is not absorbed (at least to a large degree) by the actuator assembly.

Figure 6:
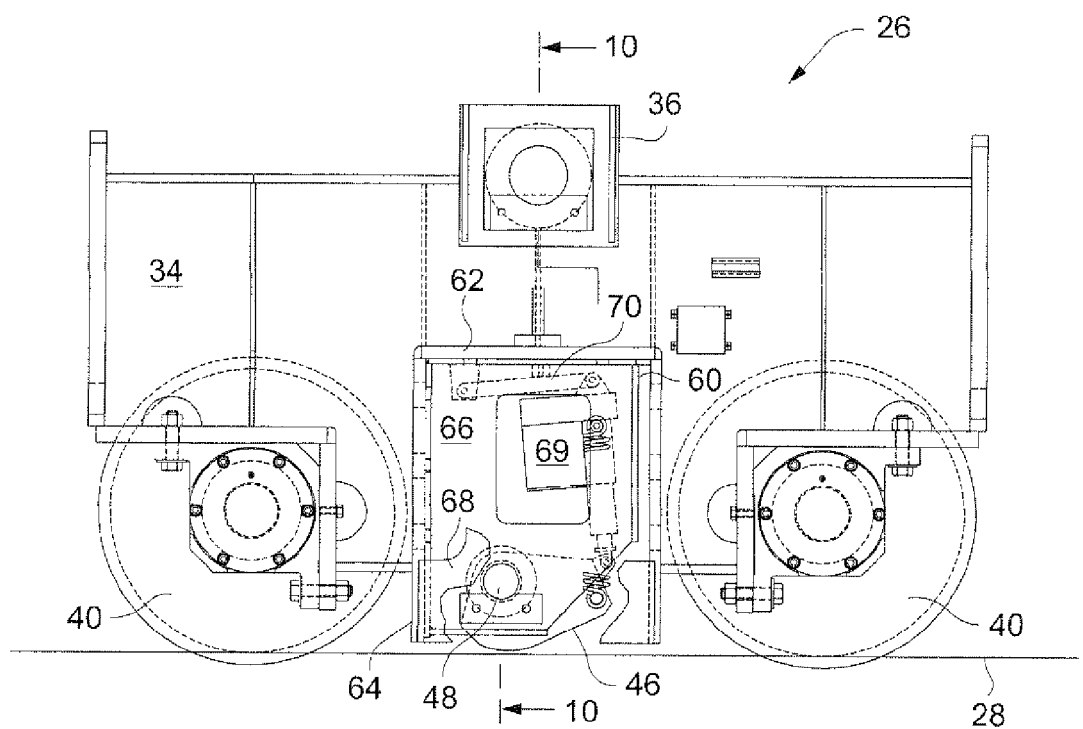
FIG. 6 is a side view of a truck assembly having a further embodiment of the storm brake disclosed herein, wherein the storm brake is shown in an up position which is disengaged from the raceway.
Figure 7:
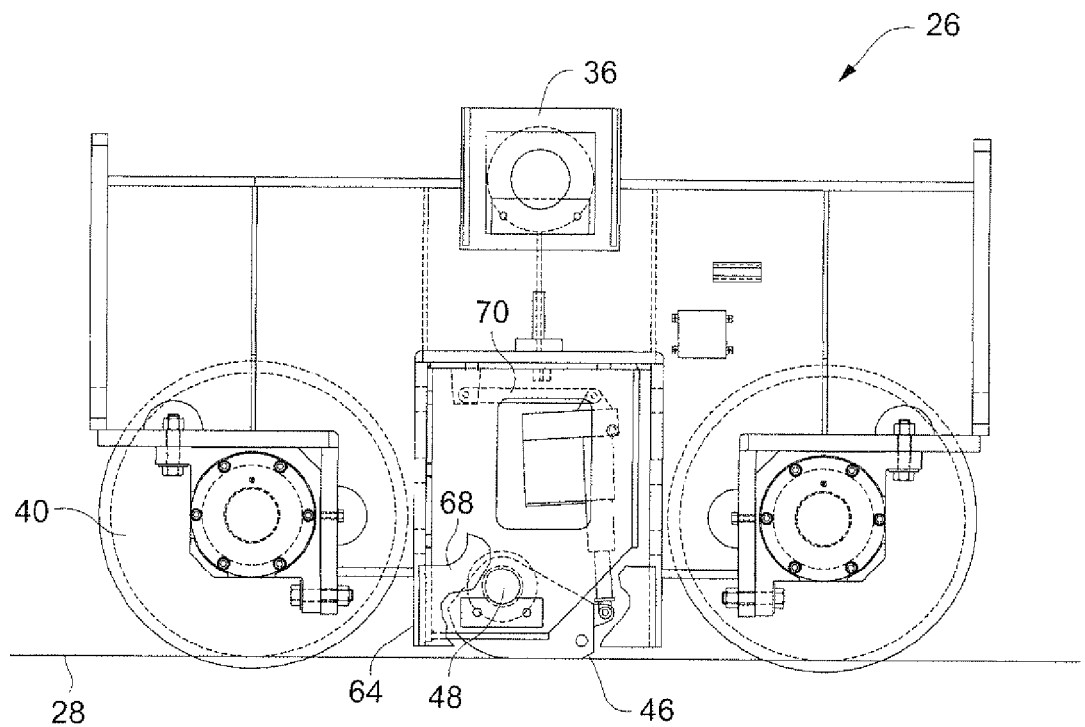
FIG. 7 is a side view of the truck assembly shown in FIG. 6, wherein the storm brake is shown in an engaged position and the actuator has not yet fully completed its engaging stroke.
Figure 8:
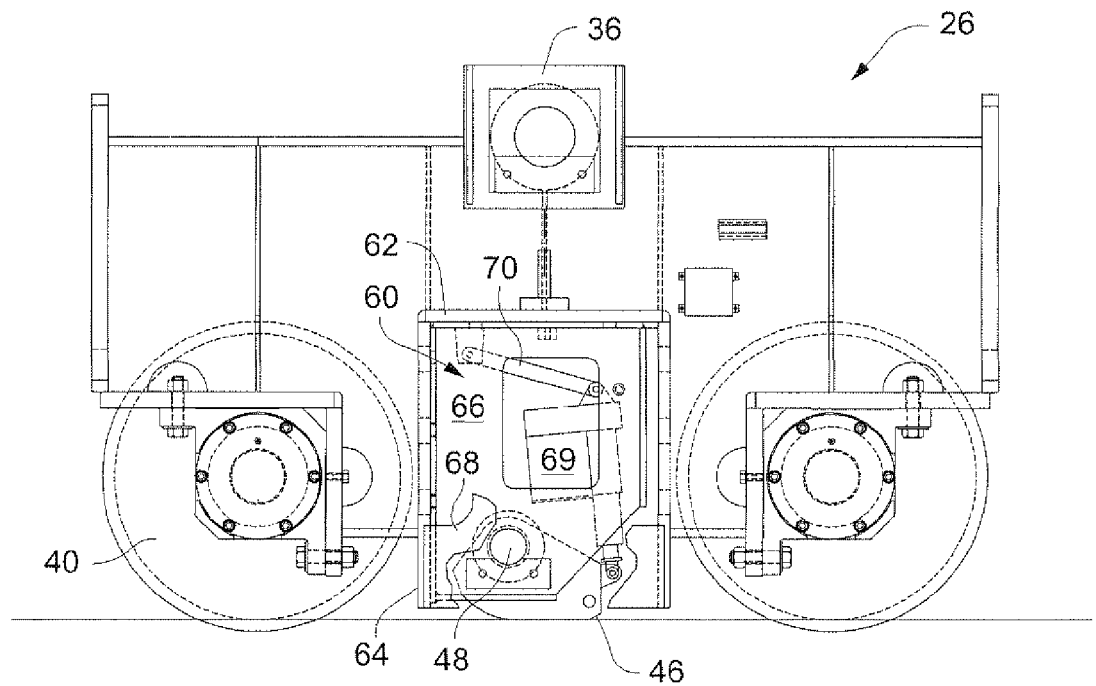
FIG. 8 is a side view of the truck assembly shown in FIG. 6, wherein the storm brake is shown in a down position in which the brake engages the raceway. The actuator has moved into a position for releasing the storm brake.
Figure 9:
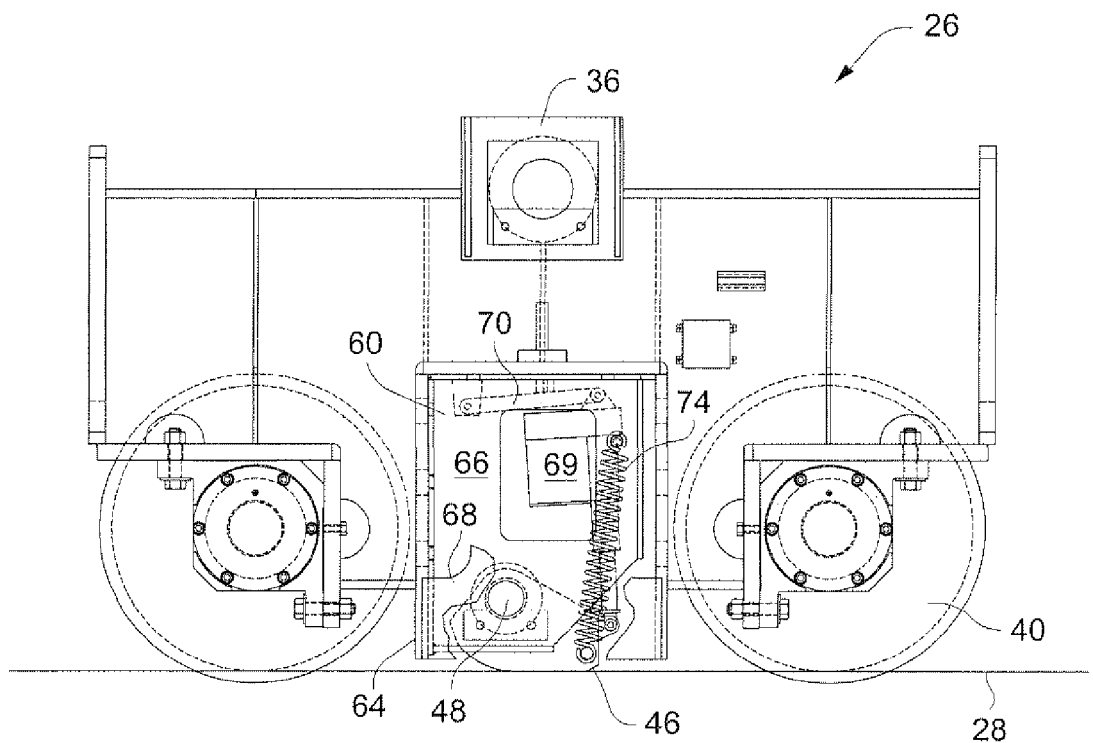
FIG. 9 is a side view of the truck assembly shown in FIG. 6, wherein the storm brake is shown connected to a spring which biases the brake in an up position. The actuator is fully extended and has completed the work stroke for engaging the storm brake.
Figure 10:
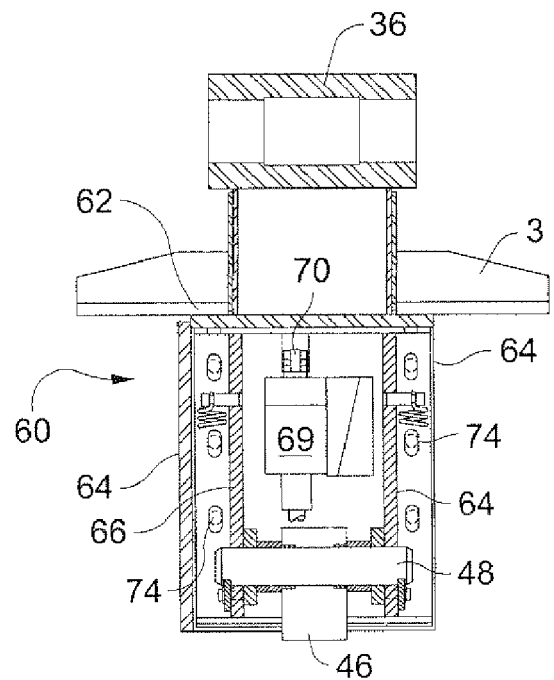
FIG. 10 is a cross-sectional view of the truck assembly and storm brake shown in FIG. 6, wherein the view is taken along line 10-10 in FIG. 6.

The operation of the storm brake assembly is shown in the sequence of FIGS. 6, 7 and 8. As shown in FIG. 6, the brake shoe 46 is pivoted in an upper position when not engaging the raceway. Normally, the lever arm assembly 70 is horizontal and adjacent the upper roof of the housing or a horizontal wall of the chassis. The lever arm assembly 70 is held up against the roof of the housing or chassis by the coil spring, as is shown in FIG. 9.

As shown in FIG. 7, the electrical motor in the actuator assembly 60 extends a leg to pivot the brake shoe down towards the raceway. Because the lever arm assembly and the upper end of the actuator are pressed up against the chassis or housing, the extension of the actuator leg necessarily pivots the brake shoe downwards. As the brake shoe engages the raceway, the brake shoe may catch on the raceway and move abruptly. This abrupt movement pulls downward the electrical actuator assembly 69 and lever arm assembly 70, as shown in FIG. 8. When pulled downward, the lever arm assembly 70 pivots from its horizontal position adjacent the roof of the housing or the underside of the chassis to an angled orientation, e.g., an angle of 10 degrees to 45 degrees, in which the end of the lever arm assembly attached to the electrical actuator is substantially below the end of the lever arm assembly attached to the housing or chassis. Because the lever arm assembly allows the entire electrical actuator to be pulled down when the brake shoe moves abruptly, the forces resulting from the abrupt movement of the shoe are not applied to the electrical actuator.

When the brake shoe is released from the raceway, the coil spring 74 pulls the lever arm assembly and electrical actuator upward. The upward movement causes the lever arm assembly to return to its normal position against the roof of the housing or underside of the chassis. While the lever arm assembly 70 is shown as having a upper position that is horizontal, the upper position is not necessarily horizontal. It is desirable that the upper position of the lever arm assembly 70 abuts against the roof of the housing, the chassis or other brace. This abutment ensures that as the actuator extends its leg the brake shoe will pivot down towards the raceway. It is also desirable that the lever arm assembly be allow to travel downward a distance at least equal to the anticipated downward rapid movement of the brake shoe as the shoe engages the raceway.

FIG. 11 is an enlarged view of the lever arm assembly 70 and actuator assembly 69. The lever arm assembly 70 includes an generally horizontally extending lever bar 94. A first end of the lever bar 94 is pivotably attached to a pivot mount 96 fixed to the housing 64 of the storm brake assembly. The pivot mount 96 may be alternatively directly attached to the chassis. The pivot mount 96 allows the lever bar 94 to pivot as indicated by arrow 97. The opposite end of the lever bar 94 is pivotably attached to an upper end 92 of the actuator assembly 69. The pivoting movement of the lever bar 94 (see arrow 97) allows the actuator assembly 69 to move up and down in a generally vertical direction show by arrows 100. A bumper 98 or other fixed stopping structure is fixed to an upper surface of the housing 64 or truck chassis. The bumper 98 stops the upward movement of the actuator assembly 69. Normally, the upper end of the actuator assembly 69 is held against the bumper 98 by the springs 74 (shown in FIG. 9). The lever arm assembly 70 allows the actuator assembly to be pulled down from the bumper 98 when a shock or other large force is applied to the stork brake shoe. After the shock or force subsides, the spring returns the actuator assembly 69 to its normal position in which the upper end 92 abuts the bumper 98.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A truck assembly for a large industrial device comprising:
    a truck chassis having a mount to support the device and a wheel engaging a raceway along which the truck assembly and device are to travel;
    a storm brake shoe pivotably mounted with respect to the truck chassis, wherein the storm brake shoe has a first pivot position in which the storm brake shoe does not engages the raceway and a second pivot position in which the storm brake shoe engages the raceway, wherein the storm brake shoe pivots from the first pivot position to the second pivot position, and pivots in a direction generally aligned with a direction of movement of the truck assembly along the raceway;
    an actuator having an extendable linkage coupled to the storm brake shoe and at an opposite end to an actuator mount coupled to the truck chassis, wherein extension of the linkage pivots the storm brake shoe from the first position to the second position, and
    the actuator mount provides a moveable engagement between the opposite end of the actuator and the truck chassis.

2. The truck assembly as in claim 1 wherein the actuator mount includes a slot which receives a pin on the opposite end of the actuator and the moveable engagement includes the pin sliding in the slot.

3. The truck assembly as in claim 2 wherein the slot is a vertical slot in a sidewall of the chassis.

4. The truck assembly as in claim 3 wherein the slot is a pair of slots each receiving an end of the pin.

5. The truck assembly as in claim 2 wherein the slot has a length of between 40 mm and 50 mm.

6. The truck assembly as in claim 1 wherein the actuator is an electrical actuator having a motor turning gears which engage the linkage, wherein the linkage is a threaded shaft extending from a casing of the actuator.

7. A truck assembly for a large industrial device comprising:
    a truck chassis having a device mount to support the device and a wheel engaging a raceway along which the truck assembly and device are to travel;
    a storm brake shoe pivotably mounted with respect to the truck chassis, wherein the storm brake shoe has a first pivot position in which the storm brake shoe does not engage the raceway and a second pivot position in which the storm brake shoe engages the raceway, wherein the storm brake shoe pivots in a direction generally aligned with a direction of movement of the truck assembly along the raceway;
    an actuator having an extendable linkage coupled to the storm brake shoe and at an opposite end to a an actuator mount coupled to the truck chassis, wherein extension of the linkage pivots the storm brake shoe from the first position to the second position, and
    the actuator mount provides a moveable engagement between the opposite end of the actuator and the truck chassis, wherein the actuator mount comprises an extended slot in the opposite end of the actuator slidably engaging a pin or post fixed to the truck chassis and the moveable engagement includes the pin or post sliding in the extended slot.

8. A truck assembly for a large industrial device comprising:
    a truck chassis having a device mount to support the device and a wheel engaging a raceway along which the truck assembly and device are to travel;
    a storm brake shoe pivotably mounted with respect to the truck chassis, wherein the storm brake shoe has a first pivot position in which the storm brake shoe does not engage the raceway and a second pivot position in which the storm brake shoe engages the raceway, wherein the storm brake shoe pivots in a direction generally aligned with a direction of movement of the truck assembly along the raceway;
    an actuator having an extendable linkage coupled to the storm brake shoe and at an opposite end to a an actuator mount coupled to the truck chassis, wherein extension of the linkage pivots the storm brake shoe from the first position to the second position, and
    the actuator mount provides a moveable engagement between the opposite end of the actuator and the truck chassis, wherein the actuator mount includes a telescoping shaft at the opposite end of the actuator.

9. A truck assembly for a large industrial device comprising:
    a truck chassis having a device mount to support the device and a wheel engaging a raceway along which the truck assembly and device are to travel;

a storm brake shoe pivotably mounted with respect to the truck chassis, wherein the storm brake shoe has a first pivot position in which the storm brake shoe does not engage the raceway and a second pivot position in which the storm brake shoe engages the raceway, wherein the storm brake shoe pivots in a direction generally aligned with a direction of movement of the truck assembly along the raceway;

an actuator having an extendable linkage coupled to the storm brake shoe and at an opposite end to a an actuator mount coupled to the truck chassis, wherein extension of the linkage pivots the storm brake shoe from the first position to the second position, and the actuator mount provides a moveable engagement between the opposite end of the actuator and the truck chassis, wherein the actuator mount includes a pivoting lever arm connected at one end to the truck chassis and at another end to the opposite end of the actuator, wherein the pivoting lever arm pivots to move the opposite end of the actuator upward and downwards.

10. The truck assembly as in claim 9 wherein the actuator mount includes a spring connected to the chassis and the actuator, wherein the spring biases the pivot arm and the opposite end of the actuator in an upward position.

11. A storm brake for a truck assembly supporting a large industrial device, wherein the truck assembly includes a truck chassis having a device mount to support the device and a wheel engaging a raceway along which the truck assembly and device are to travel, the storm brake comprising:

a storm brake shoe pivotably mounted to the truck chassis, wherein the storm brake shoe has a first pivot position in which the storm brake shoe does not engage the raceway and a second pivot position in which the storm brake shoe engages the raceway, wherein the storm brake shoe pivots in a direction generally aligned with a direction of movement of the truck assembly along the raceway;

an actuator having an extendable linkage coupled to the storm brake shoe and at an opposite end to a fixed actuator mount on the truck chassis, wherein extension of the linkage pivots the storm brake shoe from the first position to the second position, and the fixed actuator mount provides a slidable engagement between the opposite end of the actuator and the truck chassis.

12. The storm brake in claim 11 further comprising a bracket attached to a lower region of the truck chassis, wherein the storm brake shoe is mounted to an axle and bearing assembly supported by the bracket.

13. The storm brake in claim 11 further comprising a spring or counterweight attached to the storm brake shoe and at an opposite end to the truck chassis or storm brake bracket, wherein the spring biases the storm brake to the first pivot position.

14. The storm brake assembly in claim 11 wherein the actuator mount includes a slot in the chassis which receives a pin on the opposite end of the actuator and the moveable engagement includes the pin sliding in the slot.

15. A storm brake assembly for a truck assembly supporting a large industrial device, wherein the truck assembly includes a truck chassis having a device mount to support the device and a wheel engaging a raceway along which the truck assembly and device are to travel, the storm brake comprising:

a storm brake shoe pivotably mounted to the truck chassis, wherein the storm brake shoe has a first pivot position in which the storm brake shoe does not engage the raceway and a second pivot position in which the storm brake shoe engages the raceway, wherein the storm brake shoe pivots in a direction generally aligned with a direction of movement of the truck assembly along the raceway;

an actuator having an extendable linkage coupled to the storm brake shoe and at an opposite end to a fixed mounting actuator mount on the truck chassis, wherein extension of the linkage pivots the storm brake shoe from the first position to the second position, and the fixed mounting actuator mount provides a slidable engagement between the opposite end of the actuator and the truck chassis, wherein the actuator mount comprises an extended slot in the opposite end of the actuator slidably engaging a pin or post fixed to the truck chassis, and the moveable engagement includes the pin or post sliding in the extended slot.

16. A storm brake assembly for a truck assembly supporting a large industrial device, wherein the truck assembly includes a truck chassis having a device mount to support the device and a wheel engaging a raceway along which the truck assembly and device are to travel, the storm brake comprising:

a storm brake shoe pivotably mounted to the truck chassis, wherein the storm brake shoe has a first pivot position in which the storm brake shoe does not engage the raceway and a second pivot position in which the storm brake shoe engages the raceway, wherein the storm brake shoe pivots in a direction generally aligned with a direction of movement of the truck assembly along the raceway;

an actuator having an extendable linkage coupled to the storm brake shoe and at an opposite end to a fixed mounting actuator mount on the truck chassis, wherein extension of the linkage pivots the storm brake shoe from the first position to the second position, and the fixed mounting actuator mount provides a slidable engagement between the opposite end of the actuator and the truck chassis, wherein the actuator mount includes a pivoting lever arm connected at one end to the truck chassis and at another end to the opposite end of the actuator, wherein the pivoting lever arm pivots to move the opposite end of the actuator upward and downwards.

17. A truck assembly for a large industrial device comprising:

a truck chassis having a mount to support the device and a wheel engaging a a raceway along which the truck assembly and device are to travel;

a storm brake shoe pivotably mounted with respect to the truck chassis, wherein the storm brake shoe has a first pivot position in which the brake does not engage the raceway and a second pivot position in which the brake engages the raceway, wherein the storm brake shoe pivots in a direction generally aligned with a direction movement of the truck assembly along the raceway;

an actuator having an extendable linkage coupled to the storm brake shoe and at an opposite end to a mount coupled to the truck chassis, wherein extension of the linkage pivots the storm brake from the first position to the second position, and the actuator mount provides a moveable engagement between the opposite end of the actuator and the truck chassis, wherein the moveable engagement adjusts the elevation of the opposite end of the actuator.

18. The truck assembly in claim 17 wherein the actuator mount adjusts the elevation of the opposite end of the actuator is response to a force applied by the storm brake shoe to the actuator.

19. The truck assembly in claim 17 further comprising a bracket attached to a lower region of the truck chassis, wherein the storm brake shoe is mounted to an axle and bearing assembly supported by the bracket.

20. The truck assembly in claim 17 further comprising a spring or counterweight attached to the storm brake shoe and at an opposite end to the truck chassis or storm brake bracket, wherein the spring biases the storm brake shoe to the first pivot position.

21. The truck assembly in claim 17 wherein the actuator mount includes a slot in the chassis which receives a pin on the opposite end of the actuator and the moveable engagement includes the pin sliding in the slot.

22. A truck assembly for a large industrial device comprising:
- a truck chassis having a device mount to support the device and a wheel engaging a raceway along which the truck assembly and device are to travel;
- a storm brake shoe pivotably mounted with respect to the truck chassis, wherein the storm brake shoe has a first pivot position in which the storm brake shoe does not engage the raceway and a second pivot position in which the storm brake shoe engages the raceway, wherein the storm brake shoe pivots in a direction generally aligned with a direction of movement of the truck assembly along the raceway;
- an actuator having an extendable linkage coupled to the storm brake shoe and at an opposite end to a an actuator mount coupled to the truck chassis, wherein extension of the linkage pivots the storm brake shoe from the first position to the second position, and
- the actuator mount provides a moveable engagement between the opposite end of the actuator and the truck chassis, wherein the moveable engagement adjusts the elevation of the opposite end of the actuator. wherein the actuator mount comprises an extended slot in the opposite end of the actuator slidably engaging a pin or post fixed to the truck chassis, and the moveable engagement includes the pin or post sliding in the extended slot.

23. A truck assembly for a large industrial device comprising:
- a truck chassis having a device mount to support the device and a wheel engaging a raceway along which the truck assembly and device are to travel;
- a storm brake shoe pivotably mounted with respect to the truck chassis, wherein the storm brake shoe has a first pivot position in which the storm brake shoe does not engage the raceway and a second pivot position in which the storm brake shoe engages the raceway, wherein the storm brake shoe pivots in a direction generally aligned with a direction of movement of the truck assembly along the raceway;
- an actuator having an extendable linkage coupled to the storm brake shoe and at an opposite end to a an actuator mount coupled to the truck chassis, wherein extension of the linkage pivots the storm brake shoe from the first position to the second position, and
- the actuator mount provides a moveable engagement between the opposite end of the actuator and the truck chassis, wherein the moveable engagement adjusts the elevation of the opposite end of the actuator, wherein the actuator mount includes a pivoting lever arm connected at one end to the truck chassis and at another end to the opposite end of the actuator, wherein the pivoting lever arm pivots to move the opposite end of the actuator upward and downwards.

* * * * *